US012592235B2

(12) United States Patent
Krüger et al.

(10) Patent No.: US 12,592,235 B2
(45) Date of Patent: Mar. 31, 2026

(54) NLU-BASED SYSTEMS AND METHOD FOR THE FACILITATED CONTROL OF INDUSTRIAL ASSETS

(71) Applicant: Siemens Aktiengesellschaft, Munich (DE)

(72) Inventors: Daniel Krüger, Roth (DE); Florian Kubo, Fuchsstadt (DE); Martina Schubert, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 255 days.

(21) Appl. No.: 18/278,975

(22) PCT Filed: Feb. 14, 2022

(86) PCT No.: PCT/EP2022/053517
§ 371 (c)(1),
(2) Date: Aug. 25, 2023

(87) PCT Pub. No.: WO2022/179875
PCT Pub. Date: Sep. 1, 2022

(65) Prior Publication Data
US 2024/0296841 A1 Sep. 5, 2024

(30) Foreign Application Priority Data
Feb. 26, 2021 (EP) .................................... 21159613

(51) Int. Cl.
*G10L 15/18* (2013.01)
*G06F 40/30* (2020.01)
(Continued)

(52) U.S. Cl.
CPC .............. *G10L 15/22* (2013.01); *G06F 40/30* (2020.01); *G10L 15/26* (2013.01); *G10L 2015/223* (2013.01)

(58) Field of Classification Search
CPC .......... G10L 15/18; G10L 15/22; G06F 40/20
See application file for complete search history.

(56) References Cited

U.S. PATENT DOCUMENTS 7,835,911 B2 * 11/2010 Balchandran ......... G06F 40/237
704/275
9,786,277 B2 * 10/2017 Rothwell ................ G10L 15/22
(Continued)

FOREIGN PATENT DOCUMENTS

EP        3 623 880 A1     3/2020
WO     WO-2016045735 A1 *  3/2016  ........... G05B 19/042

OTHER PUBLICATIONS

Anonymous: "Tutorial—Snips NLU 0.20.2 documentation"; Jan. 1, 2018; pp. 1-8; XP055825183; URL: https://snips-nlu.readthedocs.io/en/latest/tutorial.html [retrieved on Jul. 16, 2021]; 2018.
(Continued)

*Primary Examiner* — Daniel Abebe
(74) *Attorney, Agent, or Firm* — Henry M. Feiereisen LLC

(57) ABSTRACT
A computer-executable Natural Language Understanding configuration generator is configured to generate a Natural Language Understanding configuration. The Natural Language Understanding configuration for a Natural Language
(Continued)

Understanding component is based on engineering data related to an asset of an automation system.

11 Claims, 5 Drawing Sheets

(51) Int. Cl.
    G10L 15/22 (2006.01)
    G10L 15/26 (2006.01)

(56) References Cited

U.S. PATENT DOCUMENTS

| | | | | |
|---|---|---|---|---|
| 9,792,904 | B2 * | 10/2017 | Bangalore | G10L 15/19 |
| 10,303,441 | B2 * | 5/2019 | Huebra | G06F 8/20 |
| 10,679,625 | B1 | 6/2020 | Lockhart et al. | |
| 11,211,056 | B1 * | 12/2021 | Bissell | G10L 15/30 |
| 2012/0016678 | A1 | 1/2012 | Gruber et al. | |
| 2014/0129005 | A1 * | 5/2014 | Weatherhead | G06F 21/6227 |
| | | | | 700/86 |
| 2022/0057782 | A1 | 2/2022 | Seibert et al. | |

OTHER PUBLICATIONS

Anonymous: "Generating NLU Data"; Jan. 21, 2021; pp. 1-6; XP055825184; URL: https://web.archive.org/web/20210121060212/ https://rasa.com/docs/rasa/generating-niu-data/ [retrieved on Jul. 16, 2021]; 2021.

Spieß, Hubert: "Requirements Engineering trifft IBMs Künstliche Intelligenz Watson"; 8. März 2018; XP055825154; URL: https:// www.hood-group.com/fileadmin/projects/hood-group/upload/Images/ REConf/2018/Vortrags-PDFs/DNeueWege_S2_Spiess RE_trifft_KI_ Watson.pdf [retrieved on Jul. 16, 2021]; 2018.

Hirschfeld, Diane U: "Die Macher Der Automation—Sprechen sie schon mit ihren Maschinen"; Aug. 1, 2019; XP056825208; URL: https://www.industr.com/de/A-und-D-Magazin/storage/asset/2386100/ storage/master/file/19327895/A&D%20K%2019-20.pdf [retrieved on Jul. 16, 2021]; 2019.

PCT International Search Report and Written Opinion of International Searching Authority mailed Jun. 15, 2022 corresponding to PCT International Application No. PCT/EP2022/053517 filed Feb. 14, 2022.

* cited by examiner

NLU-BASED SYSTEMS AND METHOD FOR THE FACILITATED CONTROL OF INDUSTRIAL ASSETS

CROSS-REFERENCES TO RELATED APPLICATIONS

This application is the U.S. National Stage of International Application No. PCT/EP2022/053517, filed Feb. 14, 2022, which designated the United States and has been published as International Publication No. WO 2022/179875 A1 and which claims the priority of European Patent Application, Serial No. 21159613.5, filed Feb. 26, 2021, pursuant to 35 U.S.C. 119(a)-(d).

BACKGROUND OF THE INVENTION

The invention relates to a natural language understanding configuration generator for generating a natural language understanding configuration and a computer-implemented method in which such an NLU configuration is generated.

In addition, the invention relates to a computer-readable medium with an NLU configuration generator of the aforementioned type and a system that can execute it.

The invention also relates to a computer-executable natural language understanding component comprising an NLU configuration of the type mentioned above.

Furthermore, the invention relates to a language processing system for a user interface of an asset of an automation system comprising a natural language understanding component of the type mentioned above.

The invention relates as well to a user interface with such a language processing system and the use of such a user interface for voice-assisted control of an asset in an automation system.

Automatic speech recognition (ASR) is an area of computer science, artificial intelligence and linguistics that deals with the conversion of audio data containing natural language into text data that is representative of this language. Similarly, Natural Language Understanding (NLU for short) is an area of computer science, artificial intelligence and linguistics that deals with giving computers the ability to derive meaning from text input that contains natural language. ASR and NLU are often used together as part of a language processing system. Thus, a spoken language processing system may include an ASR module that receives audio input of a user utterance and generates one or more probable transcriptions of the utterance. In addition, such a processing system can also contain an NLU module that receives a text input, for example a transcription of a user utterance, and based on this text input generates a semantic representation from which one or more machine-recognizable/readable commands can be derived. The machine-recognizable command can be recognized and processed by a computer application, for example. The command can, for example, be in the form of a command line, a control command or the like. In an automation system, this can involve control commands to the assets of the system, for example control commands to a CNC controller, which are recognized and executed for example by a PLC.

The speech interaction with technical systems is therefore based on the interaction of different technologies of machine language processing (computational linguistics). In order to initiate a technical function of an asset, for example an industrial machine, a user or an operator makes a corresponding utterance. The acoustic signal is then recorded with a microphone and, in the form of a digital audio signal, reaches the speech recognition component (ASR), which converts the spoken word sequence into a machine-readable character string.

The next step is a machine interpretation of the text with the aim of extracting the user's intention conveyed in it. It is the technology of natural language understanding (NLU) that is used for this. The task of the NLU is thus to extract the intention behind an operator's spoken utterance without inducing the operator to use a particular formalized form of expression (for example command language).

The conversion of a text into a semantic representation typically comprises three process steps: morphological analysis, syntactic analysis and semantic analysis.

The first step in the morphological analysis is the breakdown of the text into words or what are known as tokens (=tokenization). Spaces, tabs and line breaks can be viewed as separators here. Periods, commas, semicolons and colons, on the other hand, are separators or parts of tokens (for example abbreviations) depending on the application context. If the text has been broken down into a sequence of tokens, the individual words can be reduced to their stem form in a second step (=stem form reduction of the words). The aim is a reduction in the different types of tokens. Thus, for example "wrote" and "written" can be reduced to the stem "write" or "notebook" and "books" can be reduced to "book", etc.

The syntax deals with the sentence structure or more generally with the relationships between the characters. For example, syntactic analysis may include the following steps: finding sentence boundaries; Part-of-Speech (POS) tagging; phrase recognition; parsing. For example, finding sentence boundaries will determine when a punctuation mark is part of the sentence or the end of the sentence. With POS tagging, the various parts of sentences and forms of expression are marked with their parts of speech (for example noun, verb, adjective, adverb, conjunction, but also foreign words, cardinal numbers). Two sources of information can be used for this: lexicons (words and parts of speech) and syntagmatic information (frequently occurring sequences of parts of speech). Phrase recognition has the task of combining the identified words into groups of words or phrases and can be viewed as a partial grammatical analysis. Named Entity Recognition, which identifies fixed identifiers (for example personal names, plant identifiers), has a special status. The complete grammatical analysis can comprise the annotation of the sentence structure (including subject, predicate, object) and the targeted extraction of information from specific syntactic units.

Semantics is understood to be the meaningful meaning of a linguistic utterance. As part of the semantic analysis, contextual knowledge is used to break down the text into meaning-independent units. This can also include resolution of the ambiguity of certain words (for example "nut" as a food item or a machine element). Domain-specific ontologies serve as the basis for this.

The result of the interpretation carried out by NLU—a semantic representation of the text—is used by a dialog manager to relate the user's utterances to the usage context (for example intended use, capabilities of the asset, etc.). The dialog manager then forwards the identified user intention in the form of a functional query to the one or more assets of an automation system and, if necessary, accepts their response. In addition it may be able to request additional, context-related information from the user if necessary. In order to send verbal feedback to the user, the process described is run through in the opposite direction.

The feedback from the dialog manager arrives semantically encoded at a text generation component, which uses it to generate a natural language utterance as a character string.

In a final step, a speech synthesis component converts the character string into an acoustic signal that can then be output via loudspeakers.

Speech recognition systems of a general nature are well known. U.S. Pat. No. 10,679,625 B1 describes a speech recognition system that is known under the name "Alexa". However, such systems are not very well suited for use in an industrial environment. Such speech recognition systems must be individually configured and/or trained for the respective application, for example intents and entities must be redefined or determined for each new use case. Example phrases are specified for this purpose and these are often annotated manually in a second step. Expert knowledge is often used for this. After configuring/training, manual integration into the system to be used is carried out, for example into a GUI (Graphical User Interface), a HMI (Human-Machine-Interface), a CNC machine or a process control system.

Integrated engineering solutions for GUI and speech are limited to simple speech commands, i.e. the "speech" input channel ultimately only initiates events that are stored in the conventional GUI control elements. The speech interaction thus acts as a kind of remote control for the graphical user interface, wherein each step of the chain must be run through individually in the step chains stored in an operator action (for example a mouse click on the "Next" button is replaced by the voice command "Next").

The main disadvantage of the conventional applications mentioned above is that the interaction logic of an asset, for example an industrial machine, has to be formulated multiple times (for each interaction channel) during engineering, which not only entails additional work, but also increases the probability of mistakes being made.

The object of the invention can thus be seen as making systems and methods for voice control in an industrial environment simpler, more user-friendly and at the same time less error-prone.

SUMMARY OF THE INVENTION

The object is achieved with a computer-executable natural language understanding configuration generator, which is configured to generate a natural language understanding configuration for a natural language understanding component of a voice control system for at least one, for example voice controllable, asset of an automation system based on engineering data related to the at least one asset of the automation system.

In the context of the present disclosure, the term "voice-controllable asset" is understood to mean an asset that can in principle be controlled by voice commands, i.e. has a voice control system. The voice control system does not have to be fully configured, if at all.

In one embodiment, it can be provided that the asset comprises the preconfigured or unconfigured voice control system, for example, and is (re)configured by means of the NLU configuration.

The NLU configurator is thus configured to generate an NLU configuration immediately (directly) from an automation project.

In one embodiment, it can be provided that the NLU configuration generator can also be executed concurrently with an engineering, so that the NLU configuration is generated while the asset is going through its engineering phase.

Thus, a method for creating or configuring a voice control (a voice control system or a voice control program) of a preferably voice-controllable asset is disclosed, wherein during the engineering of the asset the NLU configurator creates an NLU configuration directly from the engineering data relating to the asset.

The NLU configuration generator thus makes it possible to formulate the interaction logic of an asset, in particular an industrial machine, much more easily, for example during engineering.

In one embodiment, the engineering data can be taken for example from an automation project which exists or is completed, for example.

In one embodiment, it can be provided that the NLU configuration comprises a universal NLU subconfiguration that applies to a plurality of assets and which takes into account universal functions that are present in each asset of the plurality of assets.

In one embodiment, it can be provided that the engineering data comprises data related to the structure and/or functional structure and/or user interfaces of the asset.

In one embodiment, it may be expedient if the NLU configuration generator is configured to generate annotated examples and descriptions of the data when generating the NLU configuration from the engineering data, wherein the annotated examples comprise sentences, wherein intents, entities and entity roles are identified in the sentences, and the descriptions comprise value ranges, for example valid settings for the temperature of an oven, for example 80 to 200° C. or other terms (high, low, etc.) and/or RegEx, for example valid values for a zip code, etc.

Thus, the NLU configuration can comprise the annotated examples and descriptions of the data generated from the engineering data, wherein the annotated examples comprise sentences, wherein intents, entities and entity roles are identified in the sentences, and the descriptions comprise value ranges and/or RegEx.

In one embodiment, it can be provided that the NLU configuration is stored locally, for example, at the asset location.

In one embodiment, it may be expedient that the NLU configuration comprises a number of intents, wherein at least one entity is associated with each intent.

In one embodiment, it may be expedient if each intent is implemented as an atomic function or as a chain of steps.

In one embodiment it can be provided that an intent is an initiating function of the asset, for example a machine tool.

In one embodiment it can be provided that the intents are derived from identifiers on a GUI, interface definitions and method calls in the program code, and the switching structure of the asset, for example the machine tool or its control code.

In one embodiment it can be provided that an entity role is assigned to each entity.

In one embodiment it can be provided that the entities represent parameters of the function call.

In one embodiment it can be provided that the entities are generated based on identifiers in a (user) interface, which are used for entering values (for example checkbox, text box, slider). In addition, interface descriptions, comments in the program code and standards for generating the entities can also be used. Value ranges of input parameters (for example names of screen masks, value ranges of tags, configuration of the network infrastructure) can also be generated.

In one embodiment, it can be provided that the NLU configuration comprises at least one profile in which effective areas are restricted and/or data regarding access rights.

In one embodiment, it can be provided that the NLU configuration generator derives from engineering data which functions of the asset, for example the machine tool, should/may not be executable directly via language. By default, it can also be specified that values such as for example an oven temperature, etc. are only transferred to the user interface. In order to then activate the values, a second step via another interaction channel (for example touch, gesture) is necessary. Thus, the security of the voice control can be increased.

In one embodiment, it may be useful if the NLU configuration generator is further configured to use historical data, for example control data, historical set temperature values, etc., when generating the NLU configuration. In addition, the correctness and compatibility of the historical data within the current automation system can then be checked (using the NLU configuration generator).

The object is also achieved with a computer-readable medium comprising the aforementioned computer-executable NLU configuration generator.

In addition, the object is achieved with a system wherein the system comprises at least one memory, wherein the at least one memory has the aforementioned computer-executable NLU configuration generator and at least one processor, wherein the at least one processor is operatively coupled to at least one memory and configured to execute the NLU configuration generator, wherein the NLU configuration generator, when executed by the at least one processor, causes the system to generate an NLU configuration.

Furthermore, the object is achieved with a computer-executable natural language understanding component comprising an NLU configuration generated by means of the aforementioned NLU configuration generator.

In one embodiment, it can be provided that the natural language understanding component is configured to receive text input corresponding to a user utterance and, based on the text input and with the help of the natural language understanding configuration, to generate a semantic representation of the text input, wherein based on the semantic representation of the text input at least one machine-recognizable/-readable command for the asset can be generated.

In addition, the object is achieved with a language processing system for a user interface, for example an HMI device of an asset, for example a machine tool of an automation system comprising the aforementioned natural language understanding component.

It is understood that language processing systems are intended for use in a voice control system.

In addition, the object is achieved with a user interface of an asset for an automation system comprising the aforementioned language processing system or a voice control system comprising the language processing system.

The object is achieved as well with a computer-implemented method, in which an NLU configuration for an NLU component, for example by means of the aforementioned NLU configuration generator, is generated automatically based on asset-related engineering data from an automation project.

In one embodiment, it can be provided that the NLU configuration for the NLU component is generated, for example, using the aforementioned NLU configuration generator during the engineering of the asset in an engineering project, which is generated, for example, on an engineering platform, and/or based on the engineering data is generated from an existing/completed automation project. This can take place, for example, by including the engineering data from the existing/completed automation project in the delivery. The owner of the existing/completed automation project, for example manufacturer (OEM), can also secure certain modules that contain sensitive data, for example their know-how. Such sensitive data preferably does not contain any data relevant to the NLU.

In addition, the object is achieved in that the aforementioned operator interface is used for voice-assisted control of an asset in an automation system.

BRIEF DESCRIPTION OF THE DRAWING

The invention is explained in more detail below using the exemplary embodiments shown in the figures. These show as follows.

DETAILED DESCRIPTION OF PREFERRED EMBODIMENTS

Figure 1:
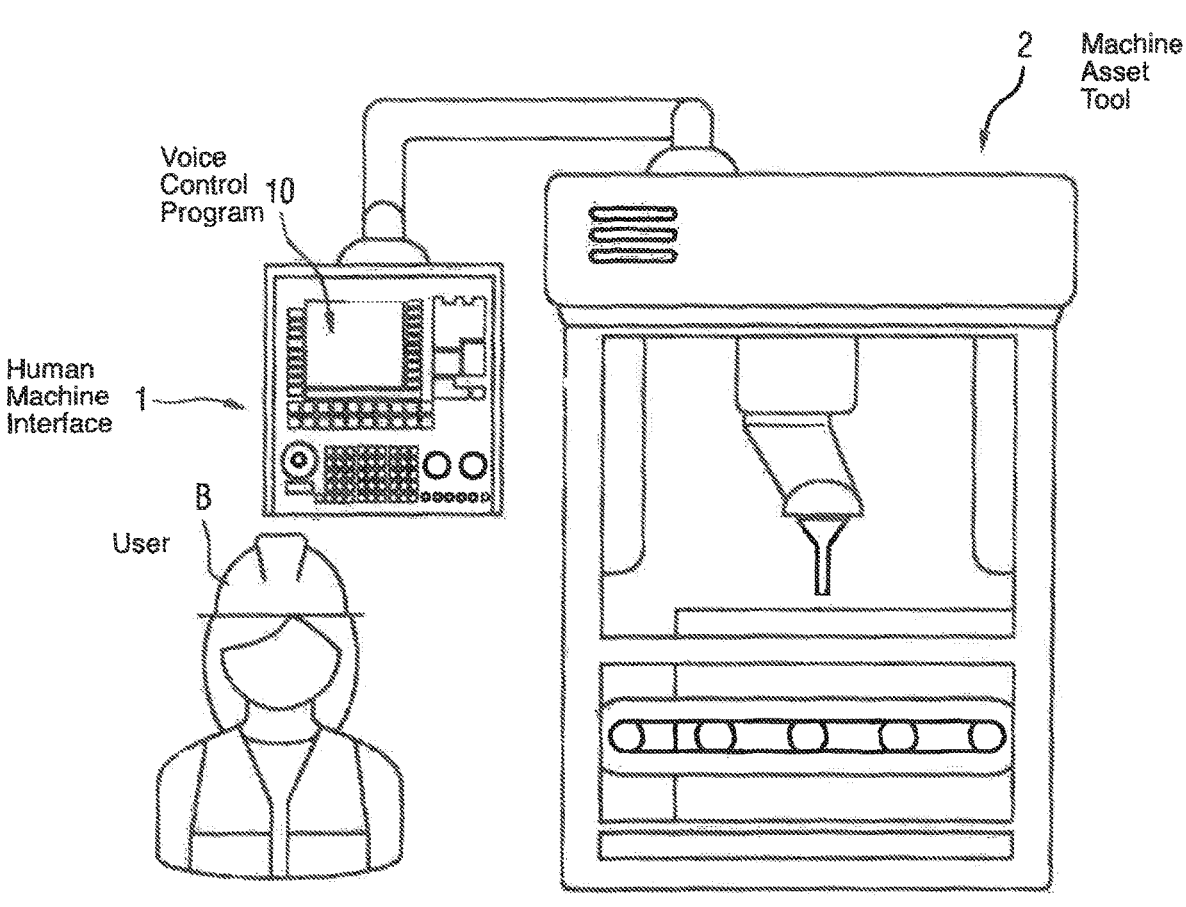
FIG. 1 an industrial environment in which voice control systems can be used.

In the exemplary embodiments and figures, elements that are the same or have the same effect can in each case be given the same reference characters. Furthermore, the reference characters in the claims and in the description are only intended for a better understanding of the present application and should in no way be construed as a limitation of the subject matter of the present invention.

FIG. 1 shows a user B, before an HMI 1 of a machine tool 2. The HMI 1 comprises a voice control program 10, with the help of which the user B can issue voice commands and receive feedback.

Figure 2:
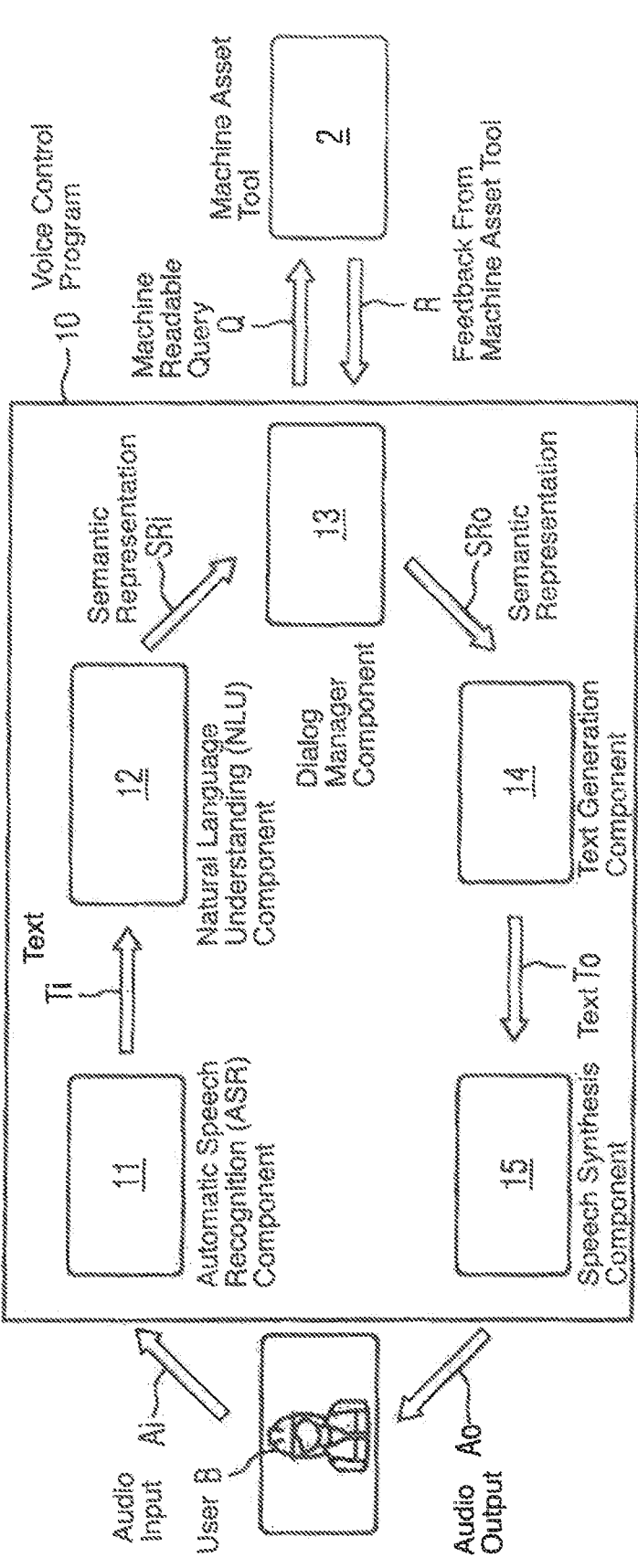
FIG. 2 a voice dialog system.

FIG. 2 shows a voice dialog between the user B and the machine tool 2 using the voice control program 10. The voice recording means (for example a microphone) or voice output means (for example a loudspeaker) are not shown here for the sake of simplicity of illustration.

The voice control program 10 receives an audio input Ai generated by the user and can generate an audio output Ao in response thereto.

The voice control program 10 comprises several components: an ASR component 11, an NLU component 12, a dialog manager component 13, a text generation component 14 and a speech synthesis component 15.

The ASR component 11 generates a text Ti from the audio input Ai, which is passed to the NLU component 12. The NLU component 12 generates a corresponding semantic representation SRI from the text Ti, which is passed to the dialog manager component 13. The dialog manager component 13 generates a machine-readable query Q to the machine 2 from the semantic representation SR of the text T. In response to the query Q the dialog manager component 13 can receive feedback R from the machine tool 2. Based on the feedback R, the dialog manager component 13 creates its semantic representation SRo for the text generation component 14, which this converts Into a text To suitable for speech synthesis. The speech synthesis component 15 then creates the audio output Ao, which is passed to the user.

Figure 3:
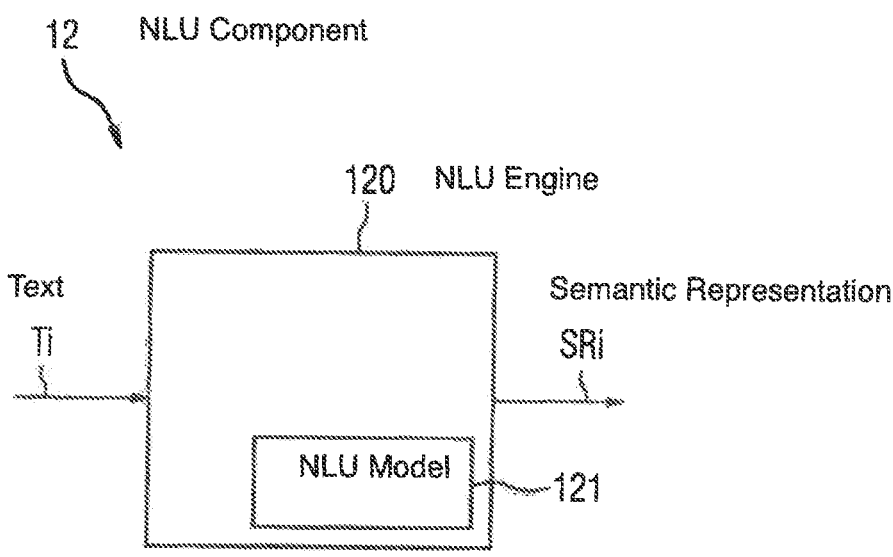
FIG. 3 an NLU engine of the NLU component of FIG. 2.

FIG. 3 shows an NLU engine 120 of the NLU component 12. In addition, the NLU component comprises an NLU model 121. The NLU model 121 can be used, for example, at runtime by the NLU engine 120 in order to interpret the texts such as Ti. If the entered texts are completely different from what the NLU model 121 knows, then they cannot be interpreted.

The NLU model 121 can thus be integrated into the HMI 1.

Figure 4:
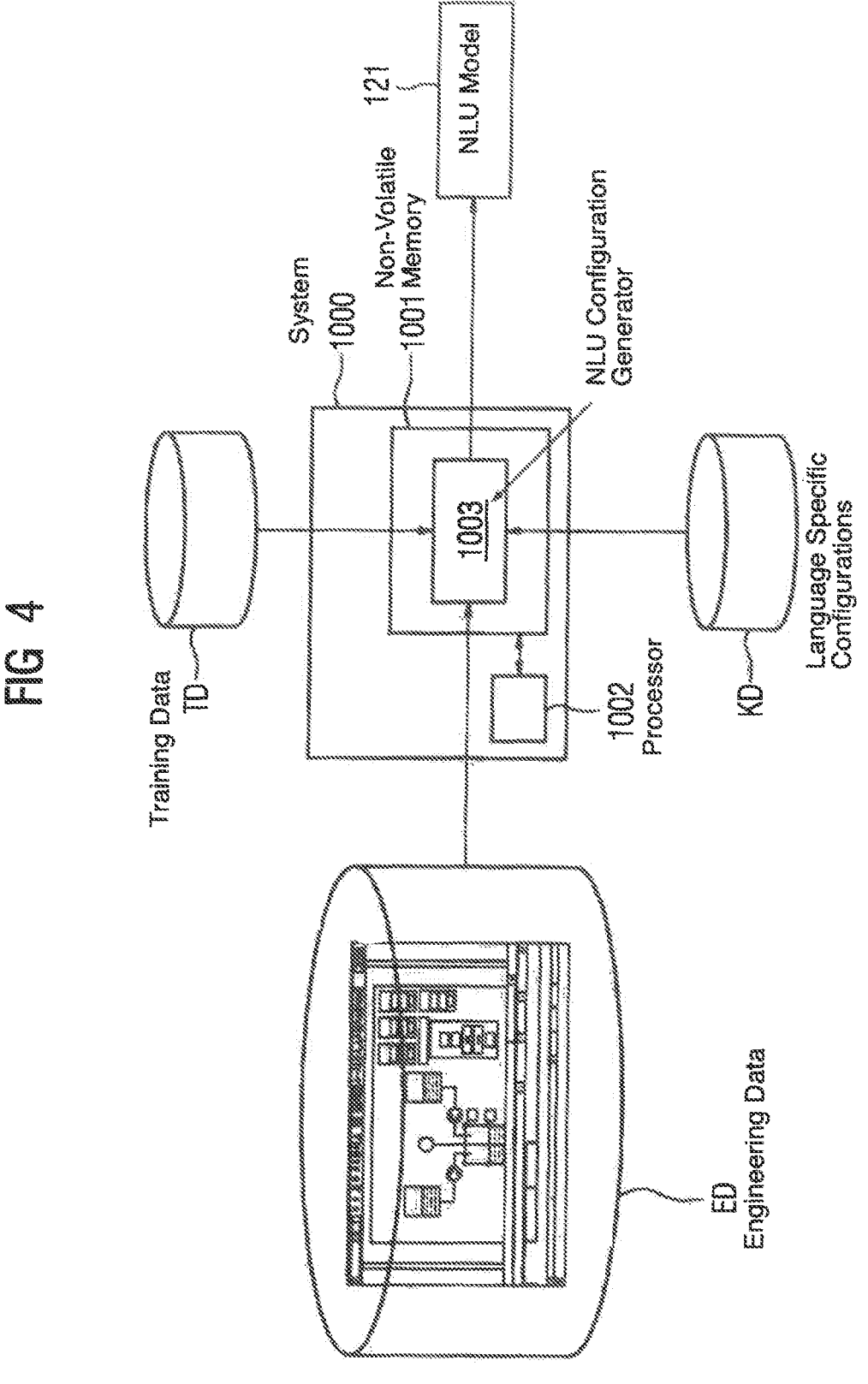
FIG. 4 a system for generating an NLU model.

FIG. 4 shows a system 1000 comprising a non-volatile memory 1001 and a processor 1002, for example CPU, operatively connected to the memory. An NLU configuration generator 1003 configured to generate the NLU model 121 is stored in the memory 1001.

To generate the NLU model 121, the NLU configuration generator 1003 uses engineering data ED. In addition, the NLU configuration generator 1003 can use additional data, for example generic NLU model training data TD and/or language-specific configurations KD. The system 1000 can obtain or have this data made available via one or more interfaces.

When the processor 1002 processes the instructions contained in the NLU configuration generator 1003, annotated examples and data descriptions, for example, are generated from the engineering data ED. The annotated examples are sentences in which, for example, intents, entities and roles are identified. Descriptions of the data are, for example, value ranges and RegEx.

The engineering data ED can, for example, be the data that arose during the engineering of the machine tool 2 in an engineering project.

Furthermore, the engineering data ED can include historical data, for example historical data relating to similar machine tools, their engineering and/or their operation (for example most frequently used commands, etc.).

The NLU configuration generator 1003 can also be executed concurrently with an engineering, so that the NLU model is generated while the machine tool 2 is going through its engineering phase.

An intent is, for example, a function of the machine tool 2 to be initiated. The intents can be derived for example from identifiers on the GUI, interface definitions and method calls in the program code, and the switching structure of the machine 2 or its control code.

An intent can be both an atomic function or a sequence of steps.

Examples of intents are: "empty feeder", "rinse tank".

Entities represent parameters of the function call. The entities can be generated based on identifiers in the interface, which are used to enter values (for example checkbox, textbox, slider). In addition, interface descriptions, comments in the program code and standards can also be used. Value ranges of input parameters (for example names of screen masks, value ranges of tags, configuration of the network infrastructure) can also be generated.

For example: "Empty feeder 1", "Rinse tank" or "Notify if oven temperature exceeds 1000° C."

If a parameter occurs more than once in an intent, then a role of each parameter can be determined. This information can be derived from the structure, the user interfaces and the interface definitions.

Example: "Schedule downtime between 1:00 p.m. and 3:00 p.m."

Here the time appears once in the role start time and once in the role end time.

The structure of an engineering project can—especially with large machines—limit effective ranges, since not every speech interaction may make sense at every point/every place.

In addition, the NLU configuration generator 1003 can use data relating to access rights from the engineering data ED, so that the access rights are taken Into account in the NLU model 121. Since, for example a lack of access rights to a screen mask (screen dialog: a dialog, dialog field, dialog window or dialog field is an element of the graphical user interface) also means that a specific function of machine tool 2 cannot be used by the logged-in user, for example by user B, via language or that a value can be read but not changed.

In addition, the NLU configuration generator 1003 can derive from engineering data ED which functions of the machine tool 2 should not be executable directly via language. If in doubt, certain functions can be excluded manually. By default, it could also be specified that the values for example an oven temperature, etc. (see above) are only transferred to the user interface. In order to then activate the values, a second step via another interaction channel (for example touch, gesture) is necessary.

The generated NLU model 121 can be used to retrofit a speech interaction to other machine tools 2 of the same type.

The NLU model 121 may also include a universal NLU submodel applicable to all machine tools, which takes into account universal functions that are present in almost every machine tool.

By automatically generating the NLU models from engineering data, the speech interaction with the machine is always consistent.

Subsequent integration into the user interface is not necessary since speech interaction is an integral component. This reduces the effort and avoids errors.

Learning synonyms at runtime simplifies configuration and ensures greater user satisfaction. In addition, frequent uploading of the application and the associated downtimes are no longer necessary.

By using dictionaries, the speech interaction can also take place in a foreign language.

The interaction logic of the machine only has to be defined once at a central point. This avoids errors and leads to increased efficiency in the development process.

Figure 5:
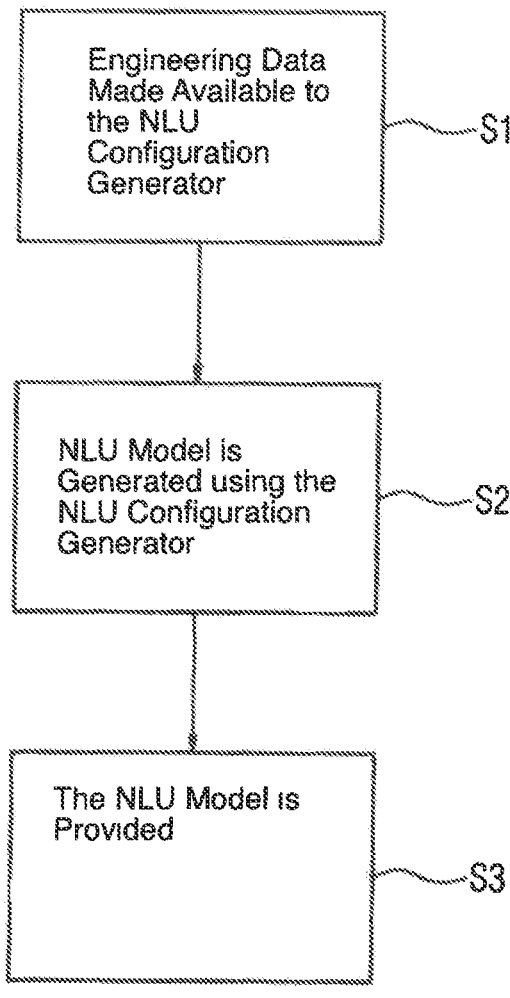
FIG. 5 a flow chart of a method for generating an NLU model.

FIG. 5 shows a flowchart of an exemplary method for generating the NLU model 121.

In a step S1, engineering data ED can be made available to the NLU configuration generator 1003 via an interface.

In a step S2, the NLU model 121 is generated using the NLU configuration generator 1003.

In a step S3, the NLU model 121 can be provided. The NLU model 121 can, for example, be stored in a memory in the HMI 1 or integrated as a software module in the NLU component 12 of the control program 10, which can also be stored in the user interface 1 of the machine tool 2.

Although the invention has been illustrated and described in detail by means of exemplary embodiments, the invention is not limited by the examples disclosed. Variations thereof can be derived by a person skilled in the art without departing from the scope of the invention as defined by the following claims.

What is claimed is:

1. A voice control system of a user interface of an asset of an automation system, the voice control system comprising:
   a natural language understanding (NLU) component comprising an NLU configuration; and
   an NLU configuration generator that automatically generates the NLU configuration based on engineering data that is related to the asset of the automation system and that is taken from an automation or engineering project, wherein the engineering data comprises data related to a structure and/or functional structure and/or user interfaces of the asset and wherein the NLU configuration generator is configured to generate annotated examples and descriptions of the data related to the structure and/or functional structure and/or user interfaces of the asset when generating the NLU configuration from the engineering data, wherein the annotated examples comprise sentences, wherein intents, entities and entity roles are identified in the sentences, and the descriptions comprise value ranges and/or RegEx.

2. The voice control system of claim 1, wherein the NLU component is configured to receive text input corresponding to a user utterance and, based on the received text input and with the NLU configuration, the NLU component is further configured to generate a semantic representation of the received text input, and based on the semantic representation of the received text input at least one machine-recognizable/-readable command for the asset is generated.

3. The voice control system of claim 1, wherein each intent is implemented as an atomic function or as a chain of steps.

4. The voice control system of claim 1, wherein an entity role is assigned to each entity.

5. The voice control system of claim 1, wherein the NLU configuration comprises at least one profile in which effective areas are restricted and/or are data regarding access rights.

6. The voice control system of claim 1, wherein the NLU configuration generator is further configured to use historical data when generating the NLU configuration.

7. The voice control system of claim 6, wherein the historical data is control data.

8. A user interface of an asset for an automation system comprising a voice control system as set forth in claim 1.

9. A computer-implemented method for configuring an NLU component of a voice control system of an asset of an automation system, the computer implemented method comprising:

automatically generating an NLU configuration of the NLU component based on engineering data relating to the asset and taken from an automation or engineering project, with the engineering data comprising data related to a structure and/or functional structure and/or user interfaces of the asset;

configuring the generated NLU configuration to generate annotated examples and descriptions of the data related to the structure and/or functional structure and/or user interfaces of the asset when generating the NLU configuration from the engineering data, wherein the annotated examples comprise sentences; and identifying Intents, entities and entity roles in the sentences and the descriptions comprise value ranges and/or RegEx.

10. The computer-implemented method of claim 9, further comprising generating the NLU configuration for the NLU component during engineering of the asset in the engineering project and/or based on the engineering data taken from an existing/completed automation project.

11. A method for voice-assisted control of an asset of an automation system, the method comprising:

automatically generating an NLU configuration of an NLU component of a voice control program based on engineering data relating to the asset and taken from an automation or engineering project, with the engineering data comprising data related to a structure and/or functional structure and/or user interfaces of the asset;

configuring the generated NLU configuration to generate annotated examples and descriptions of the data related to the structure and/or functional structure and/or user interfaces of the asset when generating the NLU configuration from the engineering data, wherein the annotated examples comprise sentences;

identifying intents, entities and entity roles in the sentences, and the descriptions comprise value ranges and/or RegEx;

receiving an audio input generated by a user of the asset of the automation system with the voice control program;

generating text from the audio input with an automatic speech recognition component of the voice control program;

generating a corresponding semantic representation from the text with the NLU component of the voice control program;

generating a machine-readable query to the asset of the automation system from the semantic representation of the text with a dialog manager component of the voice control program;

forwarding the machine-readable query as a functional query to the asset of the automation system by the dialog manager of the voice control program; and controlling the asset of the automation system according to the functional query.

* * * * *